US006038327A

United States Patent [19]

Bleim et al.

[11] Patent Number: 6,038,327

[45] Date of Patent: Mar. 14, 2000

[54] ELECTROACOUSTIC TRANSDUCER COMPRISING A CLOSING MEMBER FOR CLOSING THE REAR VOLUME OF THE TRANSDUCER

[75] Inventors: Peter Bleim, Vienna; Ewald Frasl, Biedermannsdorf; Erich Klein, Himberg; Ernst Ruberl, Guntramsdorf, all of Austria

[73] Assignee: U.S. Philips Corporation, New York, N.Y.

[21] Appl. No.: 09/033,201

[22] Filed: Mar. 2, 1998

[30] Foreign Application Priority Data

Feb. 28, 1997 [EP] European Pat. Off. .............. 97890036

[51] Int. Cl.[7] ...................... H04M 1/00

[52] U.S. Cl. .......................... 381/344; 381/386; 381/345; 379/433

[58] Field of Search .................................... 381/150, 344, 381/386, 395, 396, 412, 420, FOR 144, FOR 151, FOR 165, 345, 348, 353, 354; 379/433; 181/199

[56] References Cited

U.S. PATENT DOCUMENTS 5,231,659 7/1993 Abraham et al. ....................... 379/433

*Primary Examiner*—Huyen Le
*Attorney, Agent, or Firm*—Edward W. Goodman

[57] ABSTRACT

In an electroacoustic transducer (1) having a diaphragm (17) and a voice coil (16) connected to the diaphragm (17) in the area of the rear volume (HV) and cooperating with a magnet system (9), and including a substantially annular closing member (30) for closing the rear volume (HV), the closing member (30) has an annular body (38) and a ring projection (39), which projects obliquely from the annular body (38) along its entire circumference and is movable against spring action, at least one passage (34, 35, 36, 37) of the closing member (30), this passage having been provided in order to realize an acoustic friction between the rear volume (HV) and the acoustic free space surrounding the transducer (1), terminating in the annular contact surface (32) of the annular body (38), this annular contact surface extending transversely to the transducer axis (2).

8 Claims, 2 Drawing Sheets

ELECTROACOUSTIC TRANSDUCER COMPRISING A CLOSING MEMBER FOR CLOSING THE REAR VOLUME OF THE TRANSDUCER

BACKGROUND OF THE INVENTION

1. Field of the Invention

The invention relates to an electroacoustic transducer comprising a diaphragm which is substantially centro-symmetrical with respect to a transducer axis and which is capable of vibrating in the direction of the transducer axis, and comprising a voice coil connected to the diaphragm in the area of the rear volume of the transducer, and comprising a magnet system which is substantially centro-symmetrical with respect to the transducer axis, this magnet system being accommodated in a housing of the transducer and comprises a magnet, a cover disc adjoining the magnet, and a substantially pot-shaped yoke comprising a core disc, which also adjoins the magnet, and a hollow cylindrical yoke portion which projects from the core disc in a direction parallel to the transducer axis, and which forms an annular air gap between the cover disc and the hollow cylindrical yoke portion, the voice coil being arranged in the annular air gap, and comprising a substantially annular closing member adapted to close the rear volume, which closing member having a contact surface which extends parallel to a circle which is concentric with the transducer axis, this contact surface facing a contact portion of a part of the transducer, this part also bounding the rear volume, and the closing member having at least one passage which terminates in its contact surface, for realizing an acoustic friction between the rear volume and the acoustic free space surrounding the transducer.

2. Description of the Related Art

An electroacoustic transducer of the type defined in the opening paragraph is commercially available from Philips Electronics under the type designation WD 00917, and is known therefrom. The known transducer comprises a substantially cylindrical magnet system which includes a circular cover disc, a round disc-shaped magnet and a pot-shaped yoke which comprises a round disc-shaped base from which a hollow cylindrical yoke portion projects at the location of its perimeter, this portion changing into peripheral pot wall which extends transversely to the transducer axis. In the known transducer, this magnet system is accommodated in a plastic transducer housing. In the known transducer, the closing member for closing the rear volume of the known transducer is formed by a ring-like closing cap, which is also made of a plastic and which comprises a hollow cylindrical closing wall, which extends parallel to the transducer axis, and an annular closing disc, which is connected to this closing wall and which has a circular opening. The ring-like closing cap provided as the closing member is connected to the transducer housing with its hollow cylindrical closing wall, i.e., with the peripheral face of this wall, by ultrasonic welding in a mechanically rigid and acoustically sealed manner. With its opening, the annular closing disc is slid onto the pot-shaped yoke of the magnet system, i.e. onto the hollow cylindrical yoke portion, thus forming a contact surface of the closing cap, this contact surface being formed by the bounding surface of the opening, being concentric with and extending parallel to the transducer axis of the known transducer, and engaging with a contact portion of the hollow cylindrical yoke portion of the yoke of the magnet system, this contact portion also extending parallel to the transducer axis. In the known transducer, it is thus necessary to connect the closing member, i.e., the closing cap, to the transducer housing in a mechanically rigid as well as acoustically sealed manner and, in addition, to adapt the inner diameter of the annular closing disc of the closing cap and the outer diameter of the hollow cylindrical yoke portion of the yoke system accurately to one another. Both the acoustically sealed connection to the housing of the transducer and said adaptation of the diameters constitute an additional operation, which makes the transducer more expensive and should therefore be avoided.

SUMMARY OF THE INVENTION

It is an object of the invention to eliminate the above-mentioned problems and to provide an improved transducer in a simple manner and with simple means. To this end, the invention is characterized in that the magnet system is substantially hollow cylindrical and the magnet is an annular magnet, and the cover disc is an annular cover disc, and the core disc is an annular core disc from which the hollow cylindrical yoke portion projects in the area of an inner diameter of the annular core disc, and the closing member comprises an annular body in which the contact surface is an annular contact surface extending transversely to the transducer axis for facing the contact portion of said part of the transducer, said contact portion also extending transversely to the transducer axis, and a ring projection, projecting obliquely from the annular body along the entire circumference of the annular body, said ring portion being movable against spring action, said ring projection an acoustic sealing with a mating surface, and the at least one passage terminates in the annular contact surface of the annular body, said annular contact surface extending transversely to the transducer axis. In this way, it is achieved that the closing member can initially be connected to the transducer without an acoustically sealed connection being made between the annular body of the closing member and the transducer portion adapted to cooperate with the annular body, and that an acoustically sealed connection between the ring projection and the mating surface, and an acoustically sealed connection between the annular contact surface of the annular body of the closing member and the annular contact portion of the transducer part, adapted to cooperate with the annular body, is not formed until the transducer is mounted in an electroacoustic device, the ring projection of the closing member then being resiliently urged against a mating surface of the electroacoustic device, while, at the same time, the acoustic impedance between the rear volume of the transducer and the acoustic free space surrounding the transducer, is formed by means of the at least one passage, this acoustic impedance being required in order to obtain a desired acoustic characteristic of the transducer. In addition, the closing member in the transducer in accordance with the invention, has both a positioning function and a fixing function because, by means of the closing member, the transducer is held in a desired operating position in an electroacoustic device in a stable manner after the transducer has been mounted into this device. A further additional function of the closing member in the transducer in accordance with the invention is that, by means of the closing member, i.e., by means of the ring projection of the closing member, it is possible to compensate for mounting height tolerances.

In a transducer in accordance with the invention, the ring projection can project obliquely from the annular body towards the transducer axis. It has proven to be particularly advantageous if the ring projection of the closing member projects from the annular body of the closing member in a direction away from the transducer axis. Thus, a comparatively large diameter of the ring projection is obtained, which has proven to be advantageous because, in this way, a gentle spring action can be achieved by means of the ring projection.

In a transducer in accordance with the invention, it has further proven to be advantageous if a plurality of stabilizing projections, which are spaced at equal angles from one another, project obliquely from the annular body of the closing member in directions, with respect to the transducer axis, which are opposite to that of the ring projection. This ensures that in the built-in condition of the transducer, the annular contact surface of the annular body of the closing member always closely engages with the contact portion of the transducer part adapted to cooperate with the annular body, thereby guaranteeing a proper acoustically sealed connection between the contact surface and the contact portion.

In a transducer as defined in the preceding paragraph, it has proven to be very advantageous if the stabilizing projections project from the annular body of the closing member at substantially the same angle as the ring projection. This is advantageous in order to achieve that the spring forces applied by the ring projection and the stabilizing projections are distributed as uniformly as possible.

In a transducer having stabilizing projections, it has proven to be particularly advantageous if the closing member comprises a given number of stabilizing projections and an equal number of passages, and each stabilizing projection and each passage is disposed symmetrically with respect to a radial direction. This results in a close and relatively large-area engagement of the contact surface of the annular body of the closing member and the contact portion of a transducer part adapted to cooperate with the annular body.

In all the above-mentioned variants of a transducer in accordance with the invention, it has proven to be advantageous if a plurality of angularly equispaced projections, which extend substantially in the direction of the transducer axis, are connected to the annular body of the closing member, by means of which projections, the closing member can be connected to the a part of the transducer in order to retain the closing member. Such a construction is advantageous for a simple connection of the closing member to a transducer part.

In all the above-mentioned variants of a transducer in accordance with the invention, it has further proven to be very advantageous if the closing member is made of a plastic, preferably polyacetal. In practice, such a construction has proven to be particularly favorable because particularly polyacetal has satisfactory spring characteristics and a high temperature stability.

In all the above-mentioned variants of a transducer in accordance with the invention, it has further proven to be particularly advantageous if the transducer can be provided with differently constructed closing members which differ from one another with respect to the implementation of the passages provided in order to realize acoustic frictions and which consequently result in different acoustic characteristics of the transducer. As a result of this, a plurality of variants of a transducer in accordance with the invention, which differ from one another with respect to their acoustic characteristics, can be realized in a simple manner and substantially without additional expense.

The above-mentioned as well as further aspects of the invention will become apparent from the embodiments described hereinafter by way of examples and will be elucidated by means of these embodiments.

BRIEF DESCRIPTION OF THE DRAWINGS

The invention will now be described in more detail with reference to the drawing, which shows two embodiments to which the invention is not limited, in which.

DESCRIPTION OF THE PREFERRED EMBODIMENTS

Figure 1:
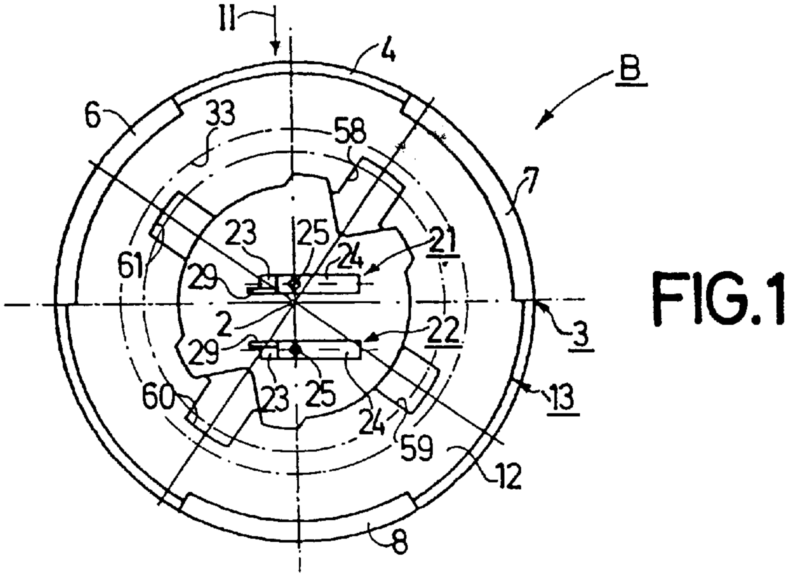
FIG. 1 is an underneath view taken at the arrow I in FIG. 2 and showing a basic unit of an electrodynamic transducer in accordance with a first embodiment of the invention, to which unit a closing member can be connected.
Figure 2:
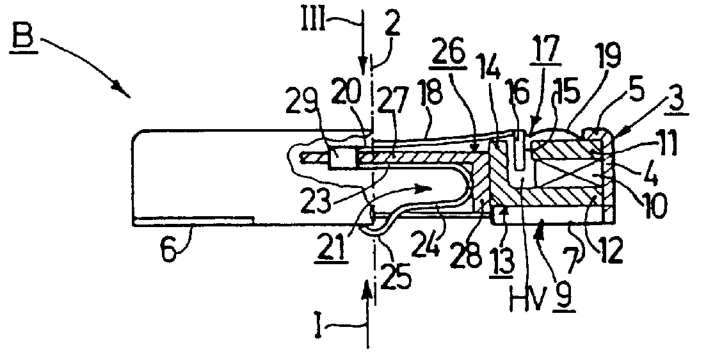
FIG. 2 shows the basic unit in a side view taken at the arrow II—II in FIG. 1 and partly in sectional view.
Figure 3:
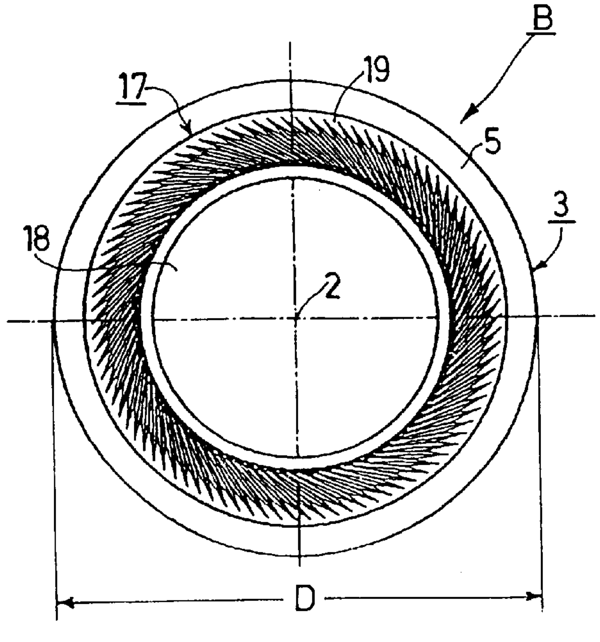
FIG. 3 shows the basic unit of FIGS. 1 and 2 in a plan view taken at the arrow III in FIG. 2.
Figure 4:
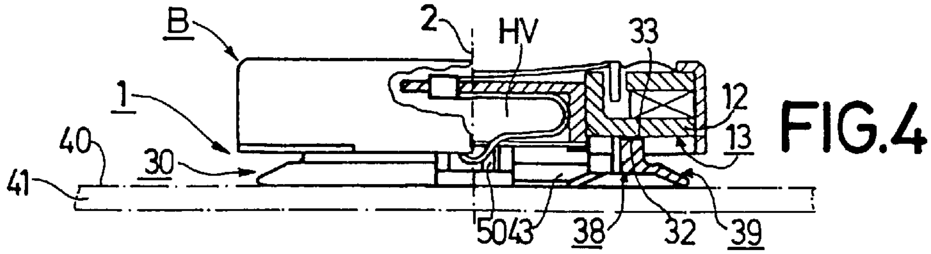
FIG. 4, similarly to FIG. 2, shows the electroacoustic transducer in accordance with the first embodiment of the invention, the basic unit and the closing member of the transducer being connected to one another.

FIGS. 1 to 3 show a basic unit B of an electrodynamic transducer 1 in a first embodiment of the invention, which is shown as a whole in FIG. 4 and which has a transducer axis 2. To accommodate and hold the individual parts of the transducer 1, the latter comprises a plastic housing 3. The housing 3 essentially comprises a hollow cylindrical circumferential wall 4, which changes into a narrow annular bounding wall 5 at the top and which has three mounting projections 6, 7 and 8 at the bottom, which are spaced at equal angles from one another. Prior to assembly of the transducer 1, the mounting projections 6, 7 and 8 project from the circumferential wall 4 in axial directions, and after all the parts of the transducer 1 have been mounted in the housing 3, said projections are bent by means of an ultrasonic process.

The transducer 1 comprises a substantially hollow cylindrical magnet system 9, which is substantially centrosymmetrical with respect to the transducer axis 2 and whose construction is apparent from FIG. 2. The magnet system 9 is accommodated in the housing 3 and comprises an annular magnet 10, also referred to as the ring magnet 10, which is adjoined by an annular cover disc 11 at its upper side, and by an annular core disc 12 of a hollow cylindrical yoke 13 at its lower side. The yoke 13 comprises the annular core disc 12 and a hollow cylindrical yoke portion 14, which projects from said disc in a direction parallel to the transducer axis 2 and whose end, which is remote from the core disc 12, extends into the area of the cover disc 11, namely, in such a manner that an annular air gap 15 is formed between the cover disc 11 and the yoke portion 14.

A voice coil 16 wound from coil wire is arranged in the air gap 15 and is shown only diagrammatically in FIG. 2 because such a construction of a coil wound from coil wire is generally known. In known manner the voice coil 16 is secured to a diaphragm 17 by means of an adhesive joint, this diaphragm being centro-symmetrical with respect to the transducer axis 2, and performing excursions in the direction of the transducer axis 2. The voice coil 16 is disposed in the rear volume of the transducer 1. The diaphragm 17 comprises a curved central portion 18 and an annular peripheral portion 19 which is connected to the cover disc 11 by an adhesive with its edge zone 8, which lies between the narrow annular bounding wall 5 of the housing 3 and the cover disc 11.

In the transducer 1 shown in FIGS. 1 to 3, the cover disc 11, the ring magnet 10, the core disc 12 of the yoke 13 and the diaphragm 17 all have the same outer diameter, which is adapted accurately to the inner diameter of the circumferential wall 4 of the housing 3 in such a manner that the core disc 12 of the yoke 13, the ring magnet 10 as well as the cover disc 11 and, consequently, also the diaphragm 17 are positioned exactly with respect to the transducer axis 2 by means of the circumferential wall 4 of the housing 3. This also results in an exact positioning of the voice coil 16 in the air gap 15, so that, always, an unimpeded vibration of the voice coil 16 is guaranteed.

The voice coil 16 made of coil wire has two coil leads 20, of which only one lead 20 is shown in FIG. 2. The transducer 1 further has two contact terminals, which are both shown in FIG. 1, but only one of these contact terminals is visible in FIG. 2. Each of the two contact terminals is electrically connected to one coil lead, preferably by soldering, but clamping is also possible. Viewed in the direction of the transducer axis, the two contact terminals are disposed inside the substantially hollow cylindrical magnet system 9.

As is apparent from FIG. 2, the contact terminals in the transducer shown in FIGS. 1 to 3 are preferably formed by substantially U-shaped spring contacts 21 and 22 having limbs 23 and 24, which extend transversely to the transducer axis 2, and of which a first limb 23 is mechanically connected to a part of the transducer 1, and of which a second limb 24 has contact faces 25 for cooperation with mating contacts, the contact faces 25 are movable substantially parallel to the transducer axis 2. The contact faces 25 are each formed by a spring contact portion bent away from the second limb 24. Suitably, the two contact faces 25 of the two spring contacts 21 and 22 are situated at different radial distances from the transducer axis 2, as is clearly shown in FIG. 1.

As stated hereinbefore, the first limb 23 of each of the two spring contacts 21 and 22 is mechanically connected to a part of the transducer 1. This part of the transducer 1, for mounting the two spring contacts 21 and 22, is formed by a substantially pot-shaped contact holder 26. The first limbs 23 of the two U-shaped spring contacts 21 and 22 are mechanically connected to a bottom wall 27 of the pot-shaped contact holder 26. By means of its hollow cylindrical circumferential wall 28, the pot-shaped contact holder 26 is mounted in the hollow cylindrical yoke portion 14 of the yoke 13 of the magnet system 9.

At the location of its free end, the first limb 23 of each of the two U-shaped spring contacts 21 and 22 has a terminal lug 29, which is inclined relative to said limb and which extends through the bottom wall 27 of the pot-shaped contact holder 26 and is connected to a respective coil lead 20. In this way the two terminal lugs 29 provide an electrical connection between, on the one hand, the coil leads 20 and, consequently, the voice coil 26 and, on the other hand, the two U-shaped spring contact 21 and 22.

As also stated hereinbefore, the U-shaped spring contacts 21 and 22 are situated inside the substantially hollow cylindrical magnet system 9, viewed in the direction of the transducer axis 2. As is apparent from FIG. 2, the two U-shaped spring contacts 21 and 22 of the transducer 1, as shown in FIGS. 1 to 3, are disposed, at least for the greater part, inside the substantially hollow cylindrical magnet system 9, also viewed in a direction transverse to the transducer axis 2. Viewed in a direction transverse to the transducer axis 2, only the contact faces 25 of the two U-shaped spring contacts 21 and 22 are situated outside the substantially hollow cylindrical magnet system 9.

As regards the electrodynamic transducer 1 of FIGS. 1 to 3, it is to be noted that this transducer 1 is shown to an enlarged scale, i.e., approximately five times full scale. At full scale of the transducer 1, the outer diameter D of the transducer 1 indicated in FIG. 3 has a nominal value of 13.2 mm. The transducer 1 is, therefore, particularly compact and is, therefore, very suitable for use in telecommunication devices, such as portable telephones and the like.

The transducer 1, as can be seen in FIG. 1, further comprises a substantially annular closing member 30 for closing the rear volume HV. This closing member 30 is shown separately in FIGS. 5, 6 and 7.

Figure 5:
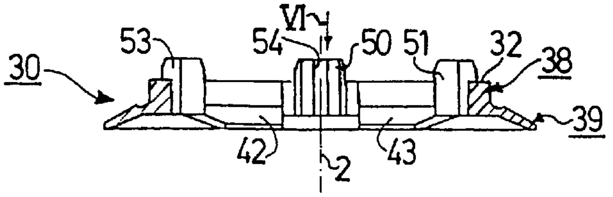
FIG. 5 shows the closing member of the transducer of FIG. 4 in a cross-sectional view taken on the line V—V in FIG. 6.
Figure 6:
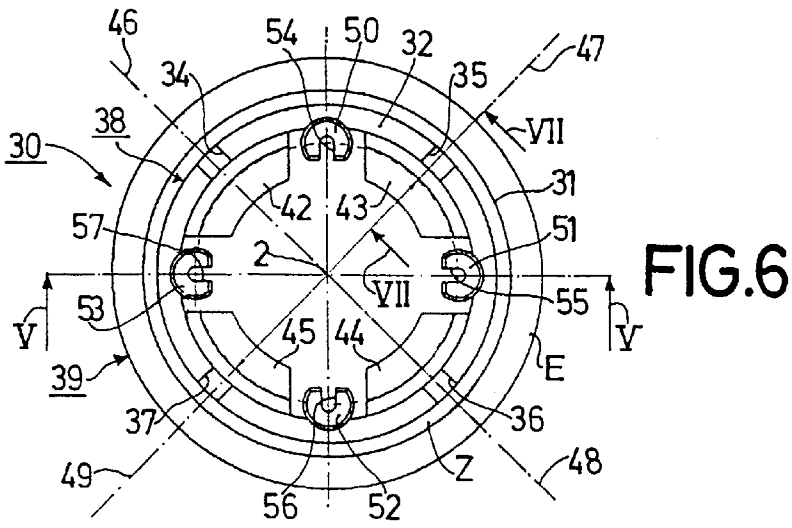
FIG. 6 shows the closing member of FIG. 5 in a plan view taken at the arrow VI in FIG. 5.
Figure 7:
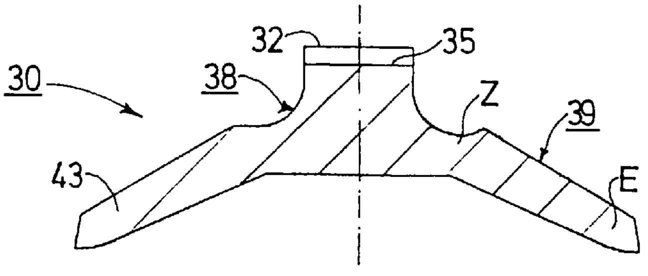
FIG. 7 shows a part of the closing member of FIGS. 5 and 6 in a sectional view taken on the line VII—VII in FIG. 6 and to an enlarged scale in comparison with FIG. 6.

The closing member 30, as shown in FIGS. 5 to 7, is made of a plastic, preferably polyacetal, because this synthetic material has suitable spring characteristics and a high temperature stability.

With a contact surface 32, which extends parallel to a circle 31 which is concentric with the transducer axis 2, the closing member 30 lies against a contact portion 33 of a part of the transducer 1, this contact portion being shown, diagrammatically, in dash-dot lines in FIG. 1, the part of the transducer 1, in the present case, being formed by the yoke 13 of the magnet system 9, i.e., by the annular core disc 12 of the yoke 13 of the magnet system 9. In the present case, the closing member 30 has a total of four passages 34, 35, 36 and 37 which open into its contact surface 32 and which serve to obtain an acoustic friction between the rear volume HV of the transducer 1 and the acoustic free space surrounding the transducer 1. By providing such passages, in order to obtain an acoustic friction, the acoustic characteristics of such an electroacoustic transducer can be influenced and defined in known manner.

As can be seen in FIGS. 5 to 7, the closing member 30 comprises an annular body 38 whose annular contact surface 32, which, in the present case, extends transversely to the transducer axis 2, faces the contact portion 33 of said part of the transducer 1, i.e., the contact portion 33 of the yoke 13, which also extends transversely to the transducer axis 2, and further comprises a ring projection 39, which projects obliquely from the annular body 38 along its entire circumference and is movable against spring action. In the present case, the spring action is mainly provided by means of an annular thinner portion Z between the annular body 38 and the ring projection 39. An acoustic sealing with the ring projection 39 is achieved with a mating surface 40. Such a mating surface 40 is shown, diagrammatically, in FIG. 4. The mating surface 40 has been provided on a supporting wall 41, shown in dash-dot lines in FIG. 4, of an electroacoustic device, which is not shown any further in FIG. 4. Thus, in the transducer 1 in accordance with the invention shown in FIG. 4, the supporting wall 41 serves for closing the rear volume HV of the transducer 1.

In the closing member 30 as shown in FIGS. 5 to 7, each of the passages 34, 35, 36 and 37 terminates in the annular contact surface 32 of the annular body 38, this annular contact surface extending transversely to the transducer axis 2.

In the closing member 30 as shown in FIGS. 5 to 7, the ring projection 39 advantageously projects from the annular body 38 in a direction away from the transducer axis 2. In the present case, the closing member 30 has four stabilizing projections 42, 43, 44 and 45 spaced at equal angles from one another. The four stabilizing projections 42, 43, 44 and 45 project obliquely from the annular body 38 of the closing member 30 in directions with respect to the transducer axis 2 which are opposite to that of the ring projection 39. In the present case, the four stabilizing projections 42, 43, 44 and 45 thus point towards the transducer axis 2.

As is clearly shown for the stabilizing projection 43 in FIG. 7, the four stabilizing projections 42, 43, 44 and 45 of the closing member 30 project from the annular body 38 of the closing member 30 at substantially the same angle as the ring projection 39.

The transducer 1, as shown in FIG. 4, thus comprises a closing member 30 having a given number of stabilizing projections, i.e., four stabilizing projections 42, 43, 44 and 45, and an equal number of passages, i.e., four passages 34, 35, 36 and 37. Each of the stabilizing projections 42, 43, 44 and 45 and each of the passages 34, 35, 36 and 37 are disposed symmetrically with respect to radial directions 46, 47, 48 and 49, respectively.

As regards the closing member 30, it is to be noted that in this closing member 30, four angularly equispaced projections 50, 51, 52 and 53, which extend substantially in the direction of the transducer axis 2, are connected to the annular body 38 of this transducer, by means of these projections, the closing member 30 is connected to the yoke 13 of the transducer 1 in order to retain the closing member 30. The projections 50, 51, 52 and 53 each have a slot 54, 55, 56 and 57 so that the projections are cross-sectionally U-shaped, the limb portions of the of the projections 50, 51, 52 and 53 being resiliently movable towards one another when the projections 50, 51, 52 and 53 are inserted, or introduced, into the holes 58, 59, 60 and 61 provided for this purpose in the yoke 13. Thus, the closing member is secured to the yoke 13 of the transducer 1 by means of the resilient action of the projections 50, 51, 52 and 53.

The transducer 1, shown in FIG. 4, has been provided with the closing member 30 as shown in FIGS. 5 to 7, this closing member having passages 34, 35, 36 and 37 of substantially rectangular cross-sectional shape. It is to be noted that the basic unit B of the transducer 1 can be connected to differently constructed closing members, i.e., that a transducer can be provided with differently constructed closing members 30, which differ from one another with respect to the shapes of the passages provided in order to obtain acoustic frictions and which consequently give rise to different acoustic characteristics of the transducer. For example, closing members, whose construction differs from that of the closing member 30 as shown in FIGS. 5 to 7, can have cross-sectionally rectangular passages whose sides have greater or smaller lengths or it can have cross-sectionally semicircular or wedge-shaped passages. Thus, by the use of differently constructed closing members, it is achieved, in a simple manner, that by means of a basic unit which is common to all transducer variants, a multitude of variants of a transducer in accordance with the invention can be realized which differ from one another with respect to their acoustic characteristics, so that it is always possible, in a simple manner, to realize a transducer which is optimized for different electroacoustic devices.

With the transducer 1 described with reference to FIGS. 1 to 7, it is achieved, in an advantageous manner, that the closing member 30 can initially be connected to the transducer without an acoustically sealed connection being made between the annular body 38 of the closing member 30 and the yoke 13 of the magnet system 9 of the transducer 1, this yoke being adapted to cooperate with the annular body 38, and that an acoustically sealed connection between the ring projection 39 and the mating surface 40 and an acoustically sealed connection between the annular contact surface 32 of the annular body 38 of the closing member 30 and the annular contact portion 33 of the yoke 13 of the magnet system 9 of the transducer 1, which yoke is adapted to cooperate with the annular body 38, is not formed until the transducer 1 is mounted in an electroacoustic device, the ring projection 39 of the closing member 30 then being resiliently urged against a mating surface 40 of the electroacoustic device, while, at the same time, the acoustic impedance, between the rear volume HV of the transducer 1 and the acoustic free space surrounding the transducer 1, is formed by means of the four passages 34, 35, 36 and 37, this acoustic impedance being required in order to obtain a desired acoustic characteristic of the transducer 1. In addition, the closing member 30 in the transducer 1 has both a positioning function and a fixing function because, by means of the closing member 30, the transducer 1 is held in a desired operating position in an electroacoustic device in a stable manner after the transducer 1 has been mounted into this electroacoustic device, which is achieved mainly due to the resilient action of the ring projection 39 of the closing member 30. A further advantage of the closing member 30 is that, by means of the closing member, i.e., by means of the ring projection 39 of the closing member, it is possible to compensate for mounting height tolerances. Since the ring projection 39 projects outwardly from the ring projection 38, a gentle spring action is achieved by means of the ring projection. The provision of the stabilizing projections 42, 43, 44 and 45 guarantees that the contact surface 32 of the annular body 38 is always acoustically sealed with respect to the contact portion 33 of the yoke 13, even when, in view of the available space, the annular body 38 is comparatively narrow and is therefore dimensionally less stable.

Figure 8:
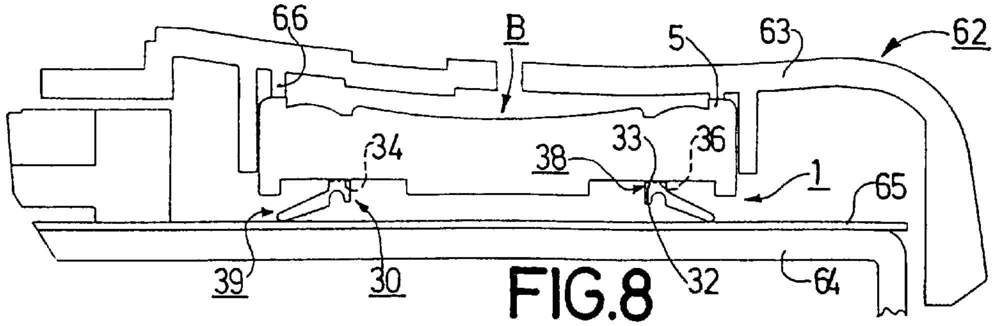
FIG. 8 shows, diagrammatically, a part of a portable telephone including an electroacoustic transducer in accordance with a second embodiment of the invention.

FIG. 8 shows a part of a portable telephone 62 having a housing 63 which accommodates a support 64 carrying a printed circuit board 65.

The telephone 62 includes an electroacoustic transducer 1 in accordance with a second embodiment of the invention. The electroacoustic transducer 1 bears, with its narrow annular bounding wall 5, on a positioning cylinder 66, which is also annular, the transducer 1 being urged against the positioning cylinder 66 by the resilient action of the ring projection 39, so that the transducer 1 is properly positioned and held in its operating position.

The closing member 30 of the transducer 1 shown in FIG. 8, does not comprise any stabilizing projections. In order to ensure that, in spite of the absence of the stabilizing projections, the contact surface 32 of the annular body 38 and the contact portion 33 of the part, not indicated in FIG. 8, of the transducer 1 always reliably engage against each other, the annular body 38 of the transducer 1 shown in FIG. 1 is constructed so as to have a suitable dimensional stability. In FIG. 8, two passages 34 and 36 of the closing member 30 are indicated by means of broken lines.

The invention is not limited to the two embodiments described above by way of examples. For example, the ring projection of a closing member can be connected to the annular body without a thinner portion and can, in itself, be elastically deformable as a whole and can consequently be movable against spring action.

What is claimed is:

1. An electroacoustic transducer comprising a diaphragm which is substantially centro-symmetrical with respect to a transducer axis, said diaphragm being capable of vibrating in the direction of the transducer axis;

a voice coil connected to the diaphragm in an area of a rear volume of the transducer;

a magnet system which is substantially centro-symmetrical with respect to the transducer axis, said magnet system being accommodated in a housing of the transducer and comprising a magnet, a cover disc adjoining the magnet, and a substantially pot-shaped yoke comprising a core disc also adjoining the magnet, and a hollow cylindrical yoke portion which projects from the core disc in a direction parallel to the transducer axis, an annular air gap being formed between the cover disc and the hollow cylindrical yoke portion, the voice coil being arranged in said annular air gap; and a substantially annular closing member for closing the rear volume of the transducer, said annular closing member having a contact surface facing a contact portion of a part of the transducer which also bounds the rear volume, said annular closing member further having at least one passage terminating in the contact surface, said at least one passage realizing an acoustic friction between the rear volume and the acoustic free space surrounding the transducer, characterized in that the magnet system is substantially hollow cylindrical wherein the magnet is an annular magnet, the cover disc is an annular cover disc, and the core disc is an annular core disc from which the hollow cylindrical yoke portion projects in the area of an inner diameter of the annular core disc, and the closing member comprises an annular body in which the contact surface is an annular contact surface extending transversely to the transducer axis for facing the contact portion of said part of the transducer, said contact portion also extending transversely to the transducer axis, and a ring projection projecting obliquely from the annular body along the entire circumference of the annular body, said ring projection being movable against spring action, said ring projection achieving an acoustic sealing with a mating surface, and the at least one passage terminates in the annular contact surface of the annular body.

2. The transducer as claimed in claim 1, characterized in that the ring projection of the closing member projects from the annular body of the closing member in a direction away from the transducer axis.

3. The transducer as claimed in claim 1, characterized in that said annular body of the closing member comprises a plurality of stabilizing projections spaced at equal angles from one another and projecting obliquely from the annular body of the closing member in directions, with respect to the transducer axis, said plurality of stabilizing projections being opposite to that of the ring projection.

4. The transducer as claimed in claim 3, characterized in that the plurality of stabilizing projections project from the annular body of the closing member at substantially the same angle as the ring projection.

5. The transducer as claimed in claim 3, characterized in that the closing member comprises a given number of stabilizing projections and an equal number of passages, each stabilizing projection and each passage being disposed symmetrically with respect to a radial direction.

6. The transducer as claimed in claim 1, characterized in that the annular body of the closing member comprises a plurality of angularly equispaced projections extending substantially in the direction of the transducer axis and connected to the annular body of the closing member, said angularly equispaced projections connecting the closing member to the part of the transducer for retaining the closing member.

7. The transducer as claimed in claim 1, characterized in that the closing member is made of a plastic, wherein the plastic comprises a polyacetal material.

8. The transducer as claimed in claim 1, characterized in that the transducer further comprises differently constructed closing members differing from one another with respect to implementation of the passages provided in order to realize acoustic frictions, said differently constructed closing members resulting in different acoustic characteristics of the transducer.

* * * * *